United States Patent [19]

Ferrero

[11] 4,391,748

[45] Jul. 5, 1983

[54] PROCESS FOR PREPARING PALATABLE SOYA PROTEINS AND PRODUCT THUS OBTAINED

[76] Inventor: Aldo Ferrero, c/o E. Merck, Postfach 4119, 6100 Darmstadt, Fed. Rep. of Germany

[21] Appl. No.: 258,847

[22] Filed: Apr. 29, 1981

[30] Foreign Application Priority Data

May 2, 1980 [IT] Italy ................................ 21735 A/80

[51] Int. Cl.³ ................................................ A23J 1/14
[52] U.S. Cl. ................................ 260/123.5; 426/656; 260/112 R
[58] Field of Search ........................ 260/123.5, 112 R; 426/656, 662

[56] References Cited

U.S. PATENT DOCUMENTS 2,632,705  6/1949  Scharf ..................................... 99/15
3,203,862  8/1965  Jones ..................................... 167/65
3,845,228  10/1974  Atkinson ............................. 426/364
4,061,784  12/1977  Youngquist .......................... 426/93
4,205,094  5/1980  Baird ................................... 426/459

FOREIGN PATENT DOCUMENTS 2834851  2/1980  Fed. Rep. of Germany .

*Primary Examiner*—Allan Lieberman
*Assistant Examiner*—Patricia Short
*Attorney, Agent, or Firm*—Millen & White

[57] ABSTRACT

A process for preparing palatable soya protein in granular or powdered form for direct human consumption, from defatted and scoured, textured or not textured, and extruded soya flour or soya protein comprises dry baking the soya starting material at a temperature in the range of 40° C. to 120° C. for a time of 3 to 14 hours and optionally, adding soya lecithin thereto. The product obtained by this process surprisingly has a taste greatly improved over that of the unbaked soya starting material.

9 Claims, No Drawings

PROCESS FOR PREPARING PALATABLE SOYA PROTEINS AND PRODUCT THUS OBTAINED

BACKGROUND OF THE INVENTION

This invention relates to a process for preparing palatable soya proteins for direct human consumption and a product thus obtained.

The high alimentary and dietetic value of the derivatives of soya seeds which are rich in vegetable proteins has been known for a long time. The prior art describes many processes for obtaining such products. These involve removal of most of the fatty materials but not the protein soluble components. The product obtained is usually referred to as T.S.P. (Textured Soya Protein) or T.V.P. (Textured Vegetable Proteins). The terms are used interchangeably herein. "Textured" in this connection means manufactured by thermoplastic extrusion and not by a spinning process.

T.V.P. is not considered to be a "ready as is" product for human consumption. It can not be chewed and ingested as such because of its disagreeable taste. Therefore, such soya proteins are used in various percentages as additives mixed with various foods such as meat, flour and the like, and to prepare cooked food, such as hamburgers, wurstels, and baked products, such as sweets, bread and the like.

It has been a longstanding problem to provide such soya protein in a palatable form.

SUMMARY OF THE INVENTION

Accordingly, it is an object of this invention to provide a process for the manufactue of soya protein such as those of the T.V.P. type which are suitable for consumption per se due to their agreeable taste.

It is another object to provide such a process whereby such soya protein can be chewed and ingested without any further processing, or can be readily added to foods, such as broth, milk, tea, yoghurt, etc., and many other non-solid foods, by simple instantaneous dispersing operations; and whereby the useability of such protein in curative treatments, e.g., for the treatment of hypercholesteremia is optimized.

It is a further object of this invention to provide a soya protein product produced by such a process.

Upon further study of the specification and appended claims, further objects and advantages of this invention will become apparent to those skilled in the art.

These objects have been attained by providing a process for preparing soya proteins of agreeable taste for human use, from defatted or scoured soya flour and/or soya proteins, comprising dry baking soya flour and/or soya proteins in the form of granules at a temperature in the range of 40° C. to 120° C. for a time of 3 to 14 hours.

DETAILED DISCUSSION

In the process of the present invention, soya proteins, preferably in the form of extruded granules, are subjected to a dry baking process, preferably in hot air driers, at a temperature in the range of 40° C. to 120° C. for a time of 3 to 14 hours. Surprisingly, after such a dry baking process, the granules take on an agreeable taste, their organoleptic characteristics having been altered. This could not have been foreseen since the original soya starting material is previously heat processed at a high temperature (about 120° C. or higher) as a result of the extrusion operation.

Suitable raw materials include commercially available T.V.P. granules, e.g., those known under the trademark "Textratein", manufactured by CARGILL (U.S.A.). Any equivalent soya product may be employed. The starting material soya protein can be used in the form of a flour but, preferably, is employed in the granular form as discussed above. If it is desired that the final product be in the form of a flour, this can be accomplished by starting with a conventional soya flour fulfilling the properties mentioned above, or by using a granular soya starting material and after completion of the process of this invention, subjecting the resultant granules to a suitable pulverization treatment.

These starting materials usually have protein contents on a dry solids basis ($N \times 6.25$) of about 50%; however, soya proteins with a higher protein content up to about 90% on the same basis can also be used. As to particle size, the soya proteins most suitable for use in the process of this invention are those in the form of irregular granules of about the following sizes: max. of 5% larger than 5.0 mm; min. of 85% from 1.2 to 5.0 mm; and max. of 7% less than 0.5 mm. Of course larger or smaller sizes can also be used, the particle sizes not being critical; however, it has been found that within the above specified size range the process is most efficient and the product most suitable for consumption. In general, the particle sizes should be 0.5–5.0 mm.

The nature of the dryer is not critical. Commercially available driers such as those commonly used for drying of alimentary pastes of small sizes (soup pastes) can be used for dry baking. Such driers consist of a closed cabinet having movable frames with narrow mesh grates inside. The meshes of the frame grates should be narrow enough to hold the granules of the above mentioned sizes, preventing the granules from falling through the meshes. The frames are movable for easy loading after T.V.P. baking.

Conveniently, the drier can be electrically operated. Of course, similar results can be achieved by using continuous driers, suitably adapted ovens, or similar expedients. The optimum drying temperature is 60° C. to 90° C., and the optimum drying time is in the range of 5 to 10 hours.

By "dry baking" is simply meant a conventional baking treatment whereby the heated component derives a lower mositure content, i.e., is dried.

The grid frames are filled with T.V.P. granules of soya up to a thickness typically of 1 to 5 centimeters, so that the hot air stream can freely circulate therethrough. Prior to processing, the proteins to be baked generally have a moisture content of about 10%. After baking, the moisture content is about 5% on the average. However, the moisture content can be lower and even slightly higher than this average value. As discussed below, this resultant moisture content is not critical. After the optimum baking period of about 5–10 hours which is sufficient to achieve the organoleptic change, the grid frames are removed and emptied. The product can be sieved to remove the pulverulent material, but this operation is not necessary. At this stage, the T.V.P. granules have already acquired the desirable taste characteristics described above.

Although rejected as a ready to use product suitable for consumption due to a disagreeable taste, following the baking of this invention, the T.V.P. soya granules become of acceptable taste, i.e., agreeable to the palate. Accordingly, they become suitable for consumption as a ready to use product without any further modification or preparation. This improvement in the organoleptic taste qualities of the T.V.P. granules is not due to loss of moisture. It is due to a structural variation resulting from the dry baking step to which the granules are subjected at a relatively moderate temperature. This occurs despite the treatment at high temperature previously applied to the starting material extrudates as a result of the extrusion operation.

As previously mentioned, a primary use of the T.V.P. granules of this invention is in the treatment of hyperchloesteremias, i.e., elevated blood cholestrol levels, via the dietary route. For these purposes, the T.V.P. granules of this invention are preferably impregnated with soya lecithin in an amount of 5% to 20% by weight based on the amount of the dry granules of soya protein being treated.

This preferred addition supplements the mentioned beneficial characteristics achieved by the baking, such as a partial impermeabilization of the granules, the taste improvement and an improvement in the T.V.P. soya granules to that corresponding to a more conventionally agreeable appearance, i.e., a color similar to that of hazel-nut granules. This appearance characteristic is important in a food to be directly ingested.

It is known that vegetable proteins, particularly soya proteins, are highly suitable for therapeutic treatments as lypostabilizers. But other soya derivatives such as phospholipids are also of curative value. It is known that soya lecithin particularly is useful in dispersing fatty materials in the blood stream, making such materials more soluble. Thus, the lecithin treatment mentioned above is very important, since the T.V.P. granules are particularly intended for medical use, such as in the treatment of hypercholesteremias. The soya lecithin enrichment increases their suitability for this purpose.

The soya lecithin suitable for use in the present invention is of alimentary standard type containing about 33% of soya oil in semi-thick form.

Such soya lecithin products are commercially available and contain about 25–40% of soya oil, 15–30% of choline lecithin, 15–25% of inositole phosphatides, 8–15% of phosphadylserine and other phosphatides, 5–12% of phosphatides lecithin, 3–7% of carbohydrates and 1–3% of sterin and tocopherol.

The precise soya lecithin used is not critical. However, pure soya lecithin without soya oil is not used although its employment in the present invention is possible practically. Such soya lecithin is subject to autoxidation and to the action of microorganisms and enzymes. Its stability is doubtful. During long periods of storage it could compromise the shelf-life of the soya proteins enriched with soya lecithin. Moreover this type of soya lecithin appears slippery, greasy and repulsive as a palatable food; it cannot be considered suitable as such for direct human consumption, even in very small doses.

By processing the granulated T.V.P. proteins dry baked according to this invention, with even high percentages of soya lecithin in paste form at a temperature such that the characteristics thereof are not impaired or destroyed (lecithins are destroyed by heating at 100° C. for 30 minutes), their curative characteristics are improved over the above mentioned advantageous properties.

In order to achieve such results for example, the dry baked soya protein granules can be placed within a fixed rotating blade drum or cylinder or any other vessel suitable for this purpose. As the blades are rotating, the soya lecithin paste is very slowly poured on the granules. The soya lecithin should be suitably pre-heated in order to make it more flowable, particularly in winter or at low temperatures. If it is too thick, dispersion thereof is difficult if not impossible. The T.V.P. granules will be readily impregnated by the soya lecithin, the latter being perfectly incorporated therein. Surprisingly, the granules so enriched with soya lecithin become even more improved in their taste, i.e., they are more agreeable when chewed and ingested than the ones not enriched with soya lecithin. Moreover, this palatablity is even strengthened during storage. There is thus made available a finished product which does not deteriorate with long periods of normal storage, and which possesses an almost unlimited shelf-life without organoleptic variation.

Such processing of the granules can also be performed before the dry baking step; but for good production results it should be done after dry baking. When the lecithin treatment is effected before the dry baking step, the subsequent dry baking must occur at compatible temperatures, i.e. in the lower part of the given temperature range.

Even at the relatively high amount or dose of 10% of lecithin, which is considered the optimum amount for curative purposes, there are no traces of greasiness or residues on the granule surfaces. Of course, as stated above, the percentage of soya lecithin can be varied to substantially higher or lower values than the optimum value of about 10%. It is essential that the soya lecithin be easily taken up by the protein granules and that the taste resulting from the addition be suitable. The amount of lecithin employed should be chosen to satisfy these functional requirements.

As can be seen, a dual result is obtained by lecithin addition, namely a higher dietetic-curative power for the resultant soya protein granules since they become enriched with a high percentage of an efficient phospholipid, i.e., soya lecithin, and an agreeable taste in a ready-to-use product. The soya T.V.P. granules of this invention are ready for sale for direct human consumption in a very wide spectrum of alimentary-dietetic applications, particularly for curative purposes. There are thus now available T.V.P. soya proteins in the form of granules, further enriched with soya lecithin which are easy to use in suitably dosed amounts for daily ingestion. Such proteins can be ingested per se, e.g., by chewing, or as an instantaneous disperion in another food, especially in a non-solid food. The daily dose of the product of this invention is about 30–80 g, preferably 50–60 g.

To satisfy persons of particular palate, the taste of the T.V.P. granules with or without lecithin can be further modified by adding fluid hazel-nut paste, optionally sweetened, or another fluid or fluidized ingredient suitable for human nourishment, e.g., by adding it at a very slow rate to the above-described rotating blade drum or cylinder. Of course, based on the above described principles the inventive process can be varied as desired, e.g., by omitting the use of soya lecithin, or replacing it with other suitable fluid or semi-fluid ingredient(s), sweetened or even salted, to prepare a consumable product in the confectionery-dietetic field.

Wihtout further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The raw material used in the process was a textured soya protein in granular form (at least 85% of the granules between 1.2 and 5 mm) commercially available under the trademark "Textratein" (manufactured by CARGILL) with the following main ingredients: about 50% raw protein, 1.5% fat (ether extract), 10% moisture content, 6.5% minerals (ash), 4.5% raw fiber.

The electric drier was a Barcaccia Mod ETB/40, provided with 40 movable wooden frames (100×50 cm) with stainless steel nets.

4 kg of the raw material was placed into each of the frames and the frames are put into the electric drier. At a drying temperature of 80° C., the granules are dried for 7 hours without interruption. After this time the frames are removed from the drier and emptied. The product was sieved with a sieve with suitable meshes to eliminate the powder formed during the drying operation. During the drying, the moisture content of the product was reduced to about 2–3%. From 160 kg of the raw material, 149 kg of the finished product was obtained.

EXAMPLE 2

The method of Example 1 was repeated. After the drying operation, 100 kg of the product was put into a stainless steel container with roating blades, having a filling-hole on the top and a rolling shutter below to unload the product after the operation.

Soya lecithin of the alimentary standard type containing about 33% of soya oil, 21% of choline lecithin, 20% of inositole phosphatides, 11% of phosphadylserine and other phosphatides, 8% of phosphatides lecithin, 5% of carbohydrates and 2% of sterin and tocopherol was heated in a drier for about 3 hours at 60° C. in order to make it more fluid.

10 kg of the warmed soya lecithin were poured very slowly (during about 5 minutes) into the container with rotating blades. Subsequently, the blades continuously rotating, the process was continued for a further 15 minutes. After some days of storage the granules impregnated with soya lecithin lost their greasy appearance; the lecithin was perfectly adsorbed by the soya protein granules. The product was ready for packing.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing palatable soya protein consisting essentially of baking extruded, textured soya protein, which has been previously dried so as to contain up to 10% of moisture, at a temperature of 40° C. to 120° C. for 3 to 14 hours thereby obtaining a product which is per se palatable.

2. A process of claim 1, wherein the baking temperature is 60° C. to 90° C. for 5–10 hours.

3. A process of claim 2 wherein the baking is conducted in a hot air dryer.

4. A process of claim 1 wherein the soya protein is in the form of granules.

5. A process of claim 4 wherein the soya protein is in the form of granules having the following particle sizes: at most 5 wt. % larger than 5.0 mm; at most 7 wt % less than 0.5 mm; and at least 85 wt % from 1.2 to 5.0 mm.

6. A process of claims 1 or 4 further comprising impregnating the soya protein, before or after the baking step, with 5% to 20% by weight of alimentary soya lecithin based on the amount of the non-impregnated soya protein.

7. A process of claim 5 wherein the amount of alimentary soya lecithin is about 10% by weight on the same basis.

8. The palatable soya protein produced by the process of claim 1, 4 or 5.

9. The palatable soya protein of claim 8 containing 5% to 20% by weight of alimentary soya lecithin based on the amount of the non-impregnated soya protein.

* * * * *